United States Patent [19]

Thorpe

[11] 4,334,568

[45] Jun. 15, 1982

[54] TIRE CHAIN

[76] Inventor: Walter H. Thorpe, 9403 Somerset, Detroit, Mich. 48224

[21] Appl. No.: 211,065

[22] Filed: Nov. 28, 1980

[51] Int. Cl.³ .............................................. B60C 27/00
[52] U.S. Cl. ..................................... 152/218; 24/299; 152/223; 152/233
[58] Field of Search ................... 152/218, 223, 225 C, 152/224, 169, 170, 225 R, 232, 233, 244, 220; 24/68 CT, 68 TT, 299, 331, 338

[56] References Cited

U.S. PATENT DOCUMENTS

| | | | |
|---|---|---|---|
| 1,568,643 | 1/1926 | Varder | 152/225 C UX |
| 2,078,764 | 4/1937 | Kielmansegg | 152/218 X |
| 2,963,064 | 12/1960 | Rucker | 152/218 |
| 3,103,242 | 9/1963 | Culp | 152/225 C UX |
| 4,176,704 | 12/1979 | Thorpe | 152/225 C |

Primary Examiner—Kittle John E.
Assistant Examiner—Thomas Bokan
Attorney, Agent, or Firm—Dolgorukov & Dolgorukov

[57] ABSTRACT

There is disclosed in the specification an improved tire chain including at least one pair of tire gripper portions adapted at one of their ends to exert pressure on the tire at the tread of the tire, and at the other end on their respective sidewall near the rim of the tire. Such tire gripper portions are adapted to grip the tire independently, but by themselves do not have strength to resist the rotational forces of the tire.

To add to the traction of the tire, and hold the individual tire gripper portions on the tire during rotation, a pair of connecting chains is employed between the two tire gripper portions. To resist disengagement from the tire during rotation by centrifugal force, a pin portion is provided on the inner end of each gripper portion which is adapted to press into the tire to a predetermined stop so that such pin portion is actually embedded in the sidewall of the tire. It is disclosed that such pin portion could also engage a preformed recess in the sidewall of the tire.

32 Claims, 7 Drawing Figures

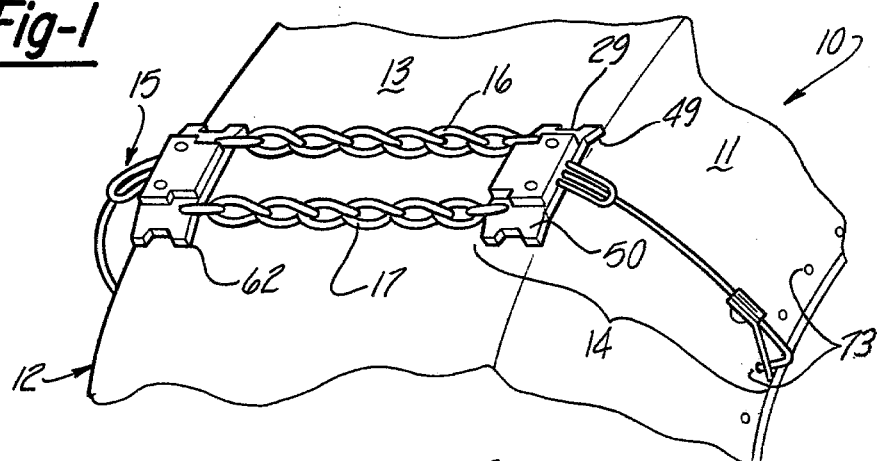
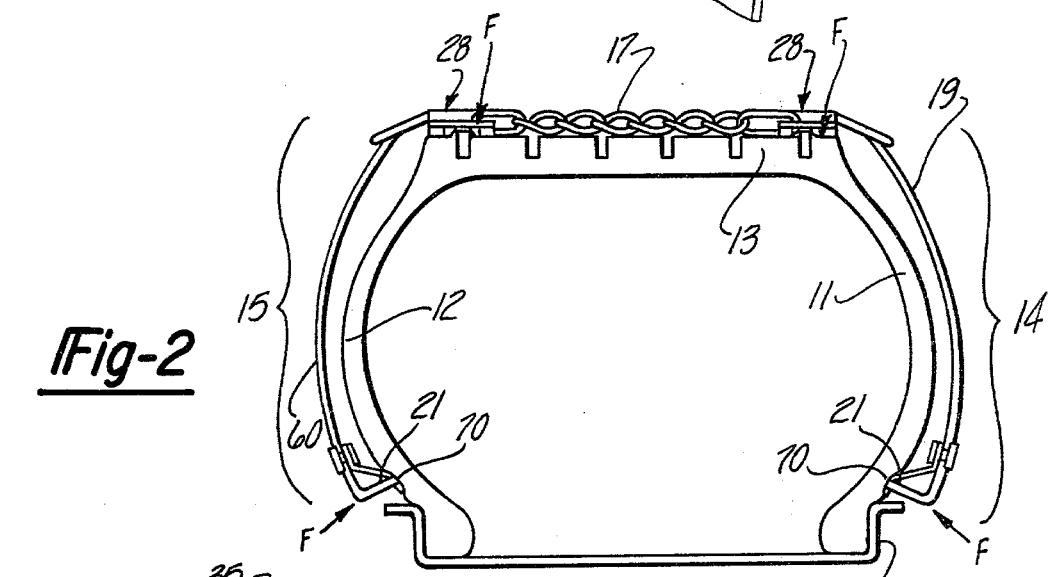

TIRE CHAIN

BACKGROUND OF THE INVENTION

The present invention concerns an improved tire chain, and more particularly concerns an improved tire chain of the type which is held onto the tire by frictional engagement therewith, without the aid of centrifugal force or positive attachment to the tire.

As one experienced in the field of providing traction devices for use an automotive-type tires under adverse driving conditions, I am familiar with attempts made in this area, and have come to the conclusion that such traction devices are basically of two types; tire chains, and emergency tire chains. Tire chains have a number of cross chains, or grips, placed on the tread about the same distance apart completely around the outer circumference of the tire, with supports to hold the cross chains on both the inner and outer sidewalls of the tire casing, and being attached in such a manner, are said to be positively fastened to the tire, or have a physical attachment to the tire.

Emergency tire chains, however, usually have only a pair of cross chains across the tread, and these chains are fastened to a strap, both at the inner and outer sidewalls of the tire, so that one strap passes through a slot in the wheel, or between the spokes of a wire wheel, and is fastened to the strap from the other side of the tire. In the case of chains which are fastened in such a manner, they are said to be positively attached to the wheel.

There is another type of emergency tire chain which is maintained on the tire initially by frictional engagement therewith, and maintained on the tire during rotation by the action of centrifugal force.

I have previously invented a device of the this type which is held onto the tire by initial frictional engagement, but maintained thereon by centrifugal force, and U.S. Pat. No. 4,176,704, entitled "Emergency Traction Device" has been issued to me thereon. Such device works entirely satisfactorily, but has been found to be rather expensive to manufacture, and some people have found it to be bulky to apply to the vehicle tire, and for that reason I continued my search for satisfactory traction devices.

The present invention concerns an improved tire chain of a type similar to an emergency tire chain in operation, but differing in appearance and installation on the tire. Whereas the emergency tire chain, as previously stated, attaches to the wheel, the device described in the present application does not attach to the wheel, nor does it attach to the tire by frictional means or by centrifugal force. The improved tire chain also lends itself to being used on tires with radial ply, steelbelted, or bias belted, polyester fiberglass construction, both of which have a extremely flexible sidewall and tread.

The improved tire chain is held onto the tire by positive attachment thereon by a kind of fastener made by providing an indentation in the tire adapted to receive a small portion of the traction device, or by having a portion of such device actually temporarily embed itself in the tire for a small distance on application, and in so doing, a device can be provided which will maintain itself on the tire just as satisfactorily, if not more so, than earlier devices, and be much, much, easier to apply, thus overcoming one of the main problems with these types of devices which has been long standing in the art.

Therefore, it is one of the objects of the present invention to provide an improved tire chain of the type which maintains itself on an automotive-type tire by a kind of fastener engagement therewith.

It is a further object of the present invention to provide such an improved tire chain, which maintains itself on an automotive-type tire, by having a small portion thereof embed itself temporarily in the sidewall of the automotive tire.

A still further object of the present invention is to provide an improved tire chain of the foregoing nature, wherein said automotive-type tire is provided with a small indentation to receive said portion of said tire chain.

Another object of the present invention is to provide a tire chain which can be placed on the automotive-type tire with very little effort by the user.

Another object of the present invention is to provide an improved tire chain having two identical gripper portions and being held together by at least one connecting chain member.

Another object of the present invention is to provide a tire chain which is light in weight, and relatively simple and inexpensive to manufacture.

A further object of the present invention is to provide an improved tire chain which can be mounted without removing the tire on which it is desired to mount the device from the vehicle.

A still further object of the present invention is to provide a device of the foregoing nature which does not require elevation of the vehicle on whose tires the device is to be mounted.

Further objects and advantages of this invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 1 is a partial perspective view showing a tire chain construction embodying the present invention mounted to an automobile tire.

FIG. 2 is a view showing a cross section of a wheel rim and tire casing showing a construction embodying the present invention mounted on, and rotated with the tire, so that it is facing the top of the vehicle fender or quarter panel, is not touching the road, and is in a no load configuration.

FIG. 3 is a partial elevational view showing the tire chain of FIG. 2 mounted to an automobile tire in its no load condition.

DESCRIPTION OF PREFERRED EMBODIMENTS

Figure 4:
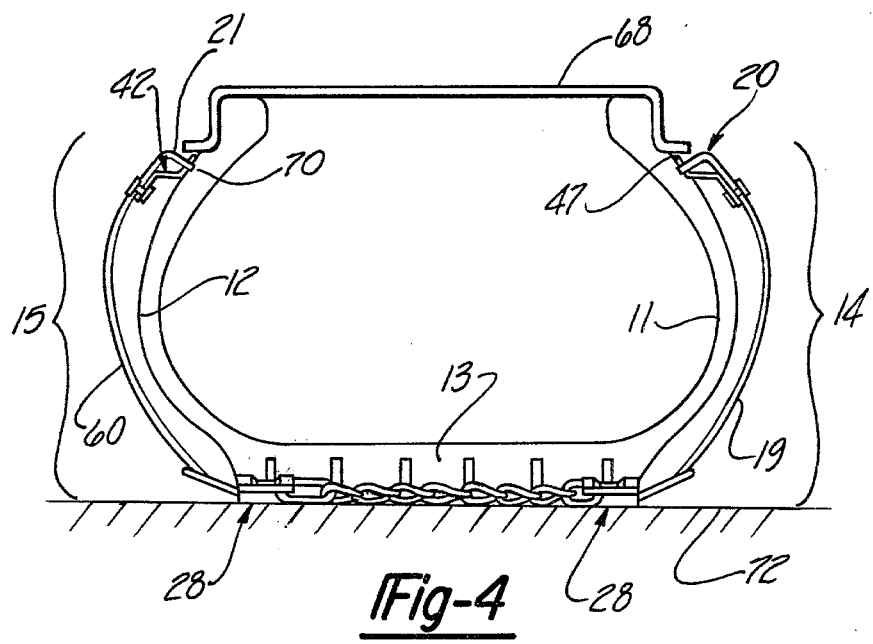
FIG. 4 is a view similar in part to FIG. 2, but showing a construction embodying the present invention mounted to an automobile tire under load because of the weight of the vehicle being applied thereto.

It is to be understood that the invention is not limited in its application to the details of construction and arrangement of parts illustrated in the accompanying drawings, since the invention is capable of other embodiments, and of being practiced or carried out in various ways within the scope of the claim. Also, it is to be understood that the phraseology and terminology employed herein is for the purpose of description and not of limitation.

Referring to FIGS. 1 and 2, my improved tire chain is shown installed on a vehicle tire generally designated by the numeral 10, and having an inner sidewall portion 11, and an outer sidewall portion 12, with a tread portion 13. My device consists generally of an inner gripper portion 14, and an outer gripper portion 15, held together by first and second connecting chains 16 and 17 respectively. It is to be understood, of course, that as few as one connecting chain, or as many as practicable connecting chains could be used, depending on the application to which my device is to be put, and other design factors.

Figures 6, 7:
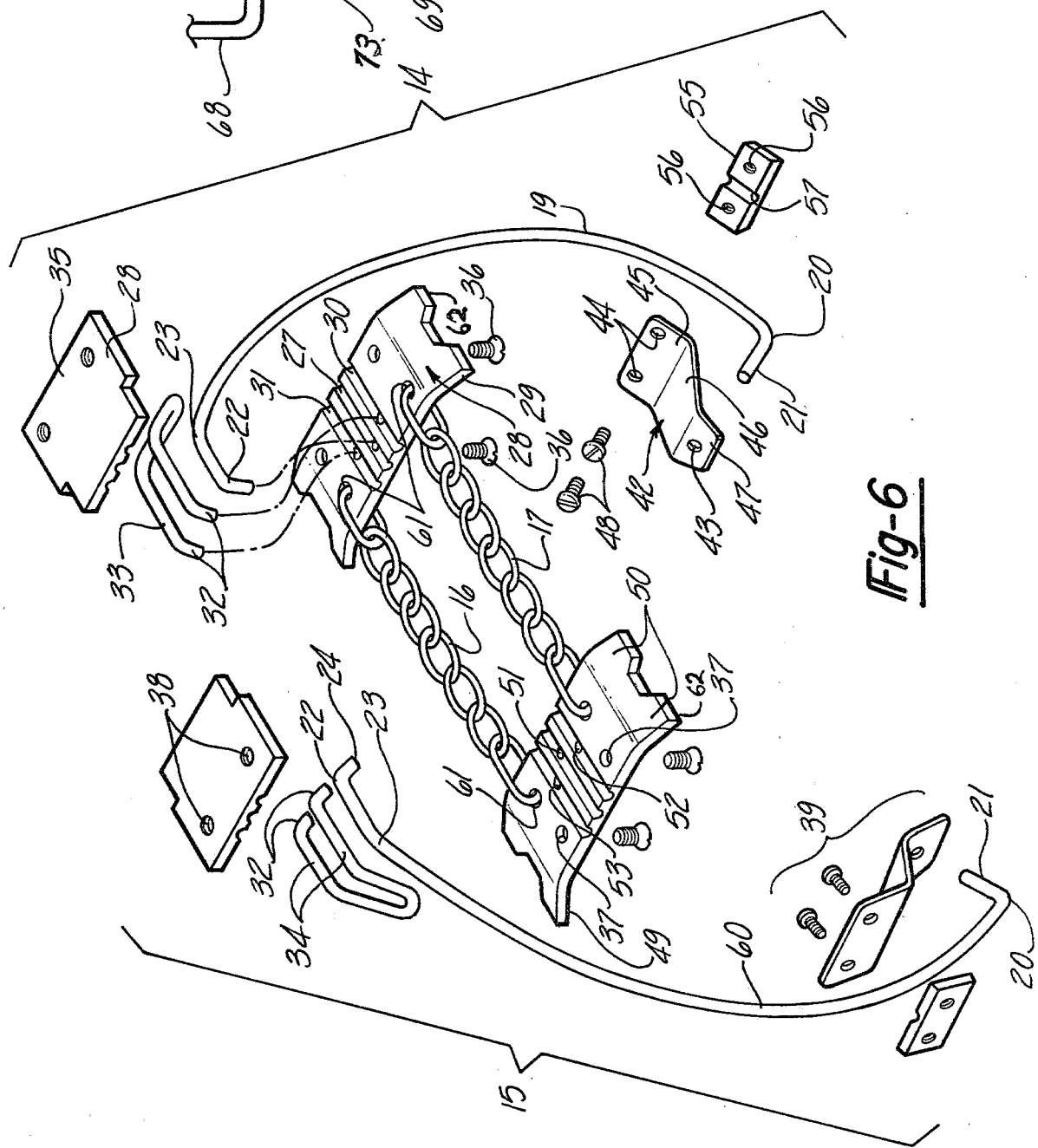
FIG. 6 is an exploded view showing the construction of the preferred embodiment of my improved tire chain.
FIG. 7 is an enlarged fragmentary view showing how a portion of the tire chain grips the sidewall of an automotive tire.

Referring to FIG. 6, it can be seen that the inner gripper portion 14 of my improved tire chain is, in reality, a mirror image of the outer gripper portion 15. The inner gripper portion 14 consists of inner wire form 19 having at its lower end a angle bend 20 therein to form a pin portion 21. At the other end of the inner wire form 19, which is of a complementary shape to the inner sidewall of the vehicle tire (shown in FIG. 2), is an compound bend 22 forming a groove wire portion 23 having a retainer 24.

Such groove wire portion 23 fits into the middle groove 27 of the lower portion 29 of a two-part holder generally designated by the numeral 28, and retainer 24 fits into the hole 51 in the middle groove of the long portion 29. The short portion 35 of the holder 28 also has a first outer groove 30 and a second outer groove 31 into which a piece of wire having substantially a U-shape, and hereinafter called U-form 33, is placed.

The U-form 33 also has a pair of retainer portions 32 and a pair of groove wire portions 34 so that one of the pair of groove wire portions 34 fits into the first outer groove 30, and one of the pair of retainers 32 fits into the hole 52 in the first outer groove 30, and the remaining groove wire portion 34 fits into the second outer groove 31, and the remaining retainer 32 fits into a hole 53 in the second outer groove 31. The short portion 35 of the holder 28, which can act as a cleat when my improved chain is applied to the tire, is then secured to the long portion 29 of the holder 28 by two screws 36 passing through the clearance holes 37 in the long portion 29 and threading into the tapped holes 38 in the short portion 35.

At the angle bend 20 of the inner gripper portion 14 is mounted a stop means generally designated by the numeral 39. Such stop means consists of a flat portion 42 having a pin hole 43 provided therein, and two screw holes 44 also provided therein. The screw holes 44 are provided in a wide tab portion 45, which is connected to a narrow tab portion 47, which has pin hole 43 provided therein, by the ramp portion 46. Fastening means, such as screws 48, are passed through the holes 44 into the mounting block 55, which has complementary threaded holes 56, and a groove 57, therein to accept the wire form 19. Of course, in assembling the stop means, the pin portion 21 of the wire form 19 is passed through the pin hole 43 before the flat portion of the stop 42 is assembled to the mounting block 55.

As mentioned above, the outer gripper portion 15 contains the identical parts to the inner gripper portion 14, except for the outer wire form 60, which is complementary in shape to the outer sidewall portion 12 of the vehicle tire 10, whereas the inner wire form 19 is complementary in shape to the inner sidewall portion 11 of the tire. Otherwise the parts are identical, and it is not felt that a detailed description of them is needed herein. It suffices to say that where the parts are identical, identical reference numerals have been applied.

To hold the inner gripper portion 14 and the outer gripper portion 15 together, the first connecting chain 16 and the second connecting chain 17 are attached to the long portion 29 of the two-part holders 28 by any suitable means, such as by being passed through the chain holes 61 and crimped.

My improved tire chain is held onto the vehicle tire by frictional engagement between the gripper portions 14 and 15 and the tread portion 13 of the tire 10 on the one hand, and by attachment to the tire by pin portions 21 and the sidewalls 11 and 12 of the tire on the other hand. The force needed to produce this frictional engagement and attachment to the sidewalls by the pin portion is produced by the inner wire form 19 and the outer wire form 60 in connection with the two-part holders 28 and stop means 39 previously described.

Because the wire forms 19 and 60 are bent to a radius smaller than the sidewalls 11 and 12 of the tire, in order for my tire chain to be applied, such wire forms must be extended under tension to a degree to be placed on the tire.

As can be seen by referring to FIG. 7, there is shown the tire rim 68 and the sidewall of the tire 69. Such could be the inner or outer sidewall of the tire. In this case let us assume that it is the inner sidewall, and we are looking at the inner gripper portion 14. In this case the stop means 39 is mounted at the rim end of the wire form 19 about the angle bend 20 as previously disclosed, and the narrow tab portion 47 of the flat portion 42 of the stop means 39 is resting against the sidewall 69 and permitting the pin portion 21 to depress the sidewall and produce an indentation therein labeled with the numeral 70.

It can be seen that any attempt for centrifugal force to through off my improved tire chain will be resisted because of the force required to dislodge the pin portion 21 normal to and indented at 70 in the sidewall. It is to be understood that the indented portion can be provided in the tire at the time of manufacture (as shown at 73 in FIG. 7), or can be simply produced by the force of the wire form 19 on the sidewall 69 (as indicated by the numeral 70 in FIGS. 2 and 4).

Referring now to FIGS. 2-5, it can be seen how my improved tire chain is held on the tire, and how it appears in operation. FIGS. 2 and 3 depict the chain mounted to the tire in its no load condition, which can be said to correspond to any portion of the tire 10 which is rotated away from contact with the road.

To place one of my improved tire chains in position on the vehicle tire as shown in FIG. 2, the pin portion 21 of the inner gripper portion 14 is placed adjacent the inner sidewall 11 of the tire 10 near the rim 68. Pressure is applied near the center of the wire form 19 and the holder 28 is lifted outwardly until it snaps over the tire tread 13. At this time, the first connecting chain and the second connecting chain, 16 and 17 respectively, are extended to their full length, and the holder 28 of the outer gripper portion 15 is placed against the tire tread 13, and the pin portion 21 of the wire form 60 is again placed adjacent the outer sidewall 12 of the tire adjacent the rim 68, and pressure is applied to the outer wire form 60 until the pin portion 21 of the wire form 60 is moved as far as possible towards the rim 68, at which time pressure is released causing the pin portion 21 to grip the tire in the manner previously described, or to fit in a premolded indentation 70 in the tire, holding my improved tire chain in position.

In FIGS. 2 and 3 I have shown a construction embodying my invention mounted to a tire which is in a no load condition, such as when the portion of the tire to which my device is applied is in a 180 degree opposed relationship to the portion of the tire contacting the road.

Figure 5:
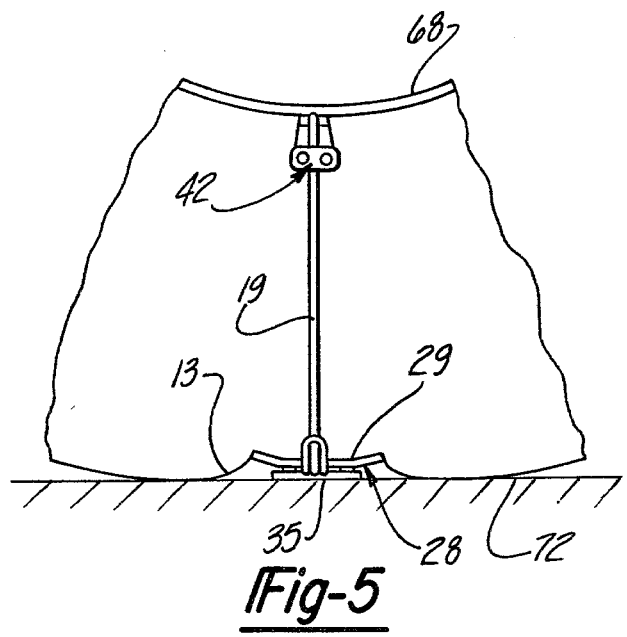
FIG. 5 is an elevational view of the portion of the tire shown in FIG. 4.

It can be seen by referring to FIGS. 4 and 5, because of the construction of my device, it will also remain fully attached when the portion of the tire on which it is mounted contacts the road and, therefore, assumes the configuration shown in FIGS. 4 and 5 in its loaded condition. It can be seen that the profile of the tire is lower than than shown in FIG. 3 due to the load applied to the tire, which has caused the inner wire form 19 and the outer wire form 60 to assume a greater curvature, but because of their spring like properties, to still grip the tire and apply a load where the holder 28 and the pin portion 21 of the wire form meet the tread and the sidewall of the tire respectively.

In order to provide additional safety to prevent the tire chain from being dislodged on the tire, such as when the tire is underinflated, or when the road surface is uneven, which causes the tire casing to be compressed more than usual, the end of the narrow tab portion 47 presses close to or against the rim 68 as shown in FIG. 4, and the inner face of the narrow tab portion 47 presses against the sidewall 69, thereby wedging the narrow tab portion 47 and the pin portion 21 securely between the wheel rim 68 and the sidewall of the tire 69.

As shown in FIG. 3, the lead angle 49, either on the front or back of the long portion of holder 29, when it rotates and strikes against the road provides less resistance to being dislodged and moved peripherally around the tread of the tire.

The lead angles as described above, in conjunction with the projections 50, of which there are two on each lead angle 49 of the long portion of holder 29, as shown in FIGS. 1 and 6, sink into the tread of the tire when the weight of the vehicle is supported by my improved tire chain. They resist being dislodged from their position by the force of the turning wheel against the stationary road surface to prevent unnecessary stretching and straining of the inner and outer gripper portions 14 and 15, as would be the case if the pin portion 21 was embedded in the indented portion 70 while at the same time the two-part holder 28 rotated around the tread.

On each projection 50 there is a sliding edge 62 which allows two-part holders 28 to slide axially or transverse to, and out from, the center part of the road to the outside edge of the tread in case of being moved inwards by an uneven road condition.

The operation of the remainder of the parts of my improved tire chain, when the tire is under compression, is exactly the same as when the tire is in its uncompressed state, and it is believed that a detailed description of the parts under compression is not required.

Thus, by constructing a tire chain which is held on by two independently acting inner and outer gripper portions, a new and novel apparatus for applying and maintaining a tire chain to an automotive-type tire is developed.

I claim:

1. An improved tire chain for use on automotive-type tires having an inner sidewall, an outer sidewall, and a tread portion, and being mounted on a rim, said improved tire chain including at least one inner gripper portion having a flexible spring-like inner wire form complementary in shape to said inner sidewall, at least one outer gripper portion having a flexible spring-like outer wire form complementary in shape to said outer sidewall and being adapted to be mounted in a 180 degree opposed relationship to said inner wire form, and one or more flexible chains fixedly mounted between said outer gripper portion and said inner gripper portion, said flexible chains being the only connection between said inner gripper portion and said outer gripper portion.

2. The device defined in claim 1, wherein said inner gripper portion includes said inner wire form having a pin portion and an angle bend at the rim end thereof and a groove wire portion with a retainer at the other end thereof, and a stop assembly mounted about said angle bend and adapted to allow said pin portion to press against said inner sidewall with a predetermined amount of force.

3. The device defined in claim 2, wherein said inner gripper portion includes a holder mounted about the groove wire portion of said inner wire form, and having a long and a short portion adapted to be held together by suitable fastening means and to grip said inner wire form therebetween.

4. The device defined in claim 3, wherein said long portion of said two-part holder has a middle groove and a hole adapted to receive said groove wire portion and said retainer of said inner wire form, and said short portion of said two-part holder has a complementary middle groove.

5. The device defined in claim 4, wherein said inner gripper portion includes a U-form device having a pair of groove wire portions and a pair of retainer portions to provide support for said inner wire form.

6. The device defined in claim 5, wherein said short portion of said holder has a first outer groove and a second outer groove provided therein, said long portion of said holder has a complementary-shaped first outer groove and a complementary-shaped second outer groove therein, and a hole in said complementary-shaped first and second grooves, all adapted when said short portion and said long portion of said holder are assembled to grip said U-form device between said halves of said holder with said U-form retainer portions fitting in said holes.

7. The device defined in claim 6, wherein said stop assembly includes a mounting block portion having a groove provided therein, and a flat portion having a wide tab portion, a ramp portion, and a narrow tab portion, said ramp portion connecting said wide and said narrow tab portions, said wide tab portion having a pin hole provided therein into which said pin portion of said inner wire form is placed.

8. The device defined in claim 7, wherein said inner wire form is adapted to have a radius slightly smaller than said inner sidewall, all adapted when said pin portion is placed on said inner sidewall near said rim, to force said inner wire form to be deformed before said holder can be placed over said tread, thereby holding said inner gripper portion to said tire by means of the force exerted on said tire by said pin portion and said holder.

9. The device defined in claim 1 or 8, wherein said outer gripper portion includes said outer wire form having a pin portion and an angle bend at the rim end thereof, a groove wire portion with a retainer at the other end thereof, and a stop assembly mounted about said angle bend and adapted to allow said pin portion to press against said outer sidewall with a predetermined amount of force.

10. The device defined in claim 9, wherein said outer gripper portion includes a holder mounted about the groove wire portion of said outer wire form, and having a long and a short portion adapted to be held together by suitable fastening means and to grip said outer wire form therebetween.

11. The device defined in claim 10, wherein said long portion of said two-part holder has a middle groove and a hole adapted to receive said groove wire portion and said retainer of said inner wire form, and said short portion of said two-part holder has a complementary middle groove.

12. The device defined in claim 11, wherein said outer gripper portion includes a U-form device having a pair of groove wire portions and a pair of retainer portions to provide support for said outer wire form.

13. The device defined in claim 12, wherein said short portion of said holder has a first outer groove and a second outer groove provided therein, said long portion of said holder having a complementary-shaped first outer groove and a complementary-shaped second outer groove therein, and a hole provided in said complementary-shaped first and second grooves, all adapted, when said short portion and said long portion of said holder are assembled, to grip said U-form device between said halves of said holder with said U-form retainer portions fitting in said holes.

14. The device in claim 13, wherein said stop assembly includes a mounting block portion having a groove provided therein, and a flat portion having a wide tab portion, a ramp portion, and a narrow tab portion, said ramp portion connecting said wide and said narrow tab portions, said wide tab portion having a pin hole provided therein into which said pin portion of said outer wire form is placed.

15. The device defined in claim 14, wherein said outer wire form is adapted to have a radius slightly smaller than said outer sidewall, all adapted when said pin portion is placed on said outer sidewall near said rim, to force said outer wire form to be deformed before said holder can be placed over said tread, thereby holding said outer gripper portion to said tire by means of the force exerted on said tire by said pin portion and said holder.

16. In combination with an automobile tire of the type having an inner and an outer sidewall with a tread portion and a rim, an improved tire chain including an inner gripper portion having a flexible spring-like inner wire form complementary in shape to said inner sidewall, an outer gripper portion including a flexible spring-like outer wire form complementary in shape to said outer sidewall, one or more flexible chains fixedly mounted between said outer gripper portion and said inner gripper portion, said flexible chains being the only connection between said inner gripper portion and said outer gripper portion, each of said wire forms including a pin portion, and a plurality of indentations provided on said inner and said outer sidewalls of said tire proximate the rim thereof and adapted to receive said pin portions of said inner and outer wire forms.

17. The device defined in claim 16, wherein said inner gripper portion includes said inner wire form having a pin portion and an angle bend at the rim end thereof, and a groove wire portion with a retainer at the other end thereof, and a stop assembly mounted about said angle bend and adapted to allow said pin portion to press against said inner sidewall with a predetermined amount of force.

18. The device defined in claim 17, wherein said inner gripper portion includes a holder mounted about the groove wire portion of said inner wire form, and having a long and a short portion adapted to be held together by suitable fastening means and to grip said inner wire form therebetween.

19. The device defined in claim 18, wherein said long portion of said two-part holder has a middle groove and a hole adapted to receive said groove wire portion and said retainer of said inner wire form, and said short portion of said two-part holder has a complementary middle groove.

20. The device defined in claim 19, wherein said inner gripper portion includes a U-form device having a pair of groove wire portions and a pair of retainer portions to provide support for said inner wire form.

21. The device defined in claim 20, wherein said bottom portion of said holder has a first outer groove and a second outer groove provided therein, said long portion of said holder has a complementary-shaped first outer groove and a complementary shaped second outer groove therein, a hole provided in said complementary-shaped first and second grooves, all adapted when said short portion and said long portion of said holder are assembled to grip said U-form device between said halves of said holder, with said U-form retainer portions fitting in said holes.

22. The device in claim 21, wherein said stop assembly includes a mounting block portion having a groove provided therein, and a flat portion having a wide tab portion, a ramp portion, and an narrow tab portion, said ramp portion connecting said wide and said narrow tab portions, said wide tab portion having a pin hole provided therein into which said pin portion of said inner wire form is placed.

23. The device defined in claim 22, wherein said inner wire form is adapted to have a radius slightly smaller than said inner sidewall, all adapted when said pin portion is placed in said indentation near said rim, to force said inner wire form to be deformed before said holder can be placed over said tread, thereby holding said inner gripper portion to said tire by means of the force exerted on said tire by said pin portion and said holder.

24. The device defined in claim 16 or 23, wherein said outer gripper portion includes said outer wire form having a pin portion and an angle bend at the rim end thereof, a groove wire portion with a retainer at the other end thereof, and a stop assembly mounted about said angle bend and adapted to allow said pin portion to press against said outer sidewall with a predetermined amount of force.

25. The device defined in claim 24, wherein said outer gripper portion includes a holder mounted about the groove wire portion of said outer wire form, and having a long and a short portion adapted to be held together by suitable fastening means and to grip said outer wire form therebetween.

26. The device defined in claim 25, wherein said long portion of said two-part holder has a middle groove and a hole adapted to receive said groove wire portion and said retainer of said inner wire form, and said short portion of said two-part holder has a complementary middle groove.

27. The device defined in claim 26, wherein said outer gripper portion includes a U-form device having a pair of groove wire portions and a pair of retainer portions to provide support for said outer wire form.

28. The device defined in claim 27, wherein said short portion of said holder has a first outer groove and a second outer groove provided therein, said long portion of said holder has a complementary-shaped first outer groove and a complementary-shaped second outer groove therein, a hole provided in said first and second complementary-shaped grooves, all adapted when said short portion and said long portion of said holder are assembled to grip said U-form device between said halves of said holder, with said U-form retainer portion fitting in said holes.

29. The device defined in claim 28, wherein said stop assembly includes a mounting block portion having a groove provided therein, and a flat portion having a wide tab portion, a ramp portion, and a narrow tab portion, said ramp portion connecting said wide and said narrow tab portions, said wide tab portion having a pin hole provided therein into which said pin portion of said outer wire form is placed.

30. The device defined in claim 29, wherein said outer wire form is adapted to have a radius slightly smaller than said outer sidewall, all adapted when said pin portion is placed in said indentation near said rim, to force said outer wire form to be deformed before said holder can be placed over said tread, thereby holding said outer gripper portion to said tire by means of the force exerted on said tire by said pin portion and said holder.

31. The device defined in claim 15, wherein said long portion of said two-part holder includes a lead angle provided on each end thereof, each lead angle having provided thereon a pair of projections, each projection being provided with a sliding edge.

32. The device defined in claim 30, wherein said long portion of said two-part holder includes a lead angle provided on each end thereof, each lead angle having provided therein a pair of projections, each projection being provided with a sliding edge.

* * * * *